United States Patent
Pu et al.

(10) Patent No.: US 11,928,053 B2
(45) Date of Patent: Mar. 12, 2024

(54) SYSTEM GARBAGE COLLECTION METHOD AND METHOD FOR GARBAGE COLLECTION IN SOLID STATE DISK

(71) Applicant: Huawei Technologies Co., Ltd., Shenzhen (CN)

(72) Inventors: Guiyou Pu, Chengdu (CN); Yang Liu, Chengdu (CN); Qiang Xue, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 818 days.

(21) Appl. No.: 17/021,413

(22) Filed: Sep. 15, 2020

(65) Prior Publication Data

US 2020/0409840 A1 Dec. 31, 2020

Related U.S. Application Data

(63) Continuation of application No. PCT/CN2019/079391, filed on Mar. 23, 2019.

(30) Foreign Application Priority Data

Sep. 12, 2018 (CN) .................... 201811064493.X
Oct. 23, 2018 (CN) .................... 201811233512.7

(51) Int. Cl.
*G06F 3/06* (2006.01)
*G06F 12/02* (2006.01)

(52) U.S. Cl.
CPC ........ *G06F 12/0253* (2013.01); *G06F 3/0604* (2013.01); *G06F 3/0631* (2013.01); *G06F 3/0679* (2013.01); *G06F 2212/7205* (2013.01)

(58) Field of Classification Search
CPC .. G06F 12/0253; G06F 3/0604; G06F 3/0631; G06F 3/0679; G06F 2212/7205

USPC .................................................. 711/104
See application file for complete search history.

(56) References Cited

U.S. PATENT DOCUMENTS

| | | | |
|---|---|---|---|
| 9,021,187 B2 | 4/2015 | Sela et al. | |
| 10,073,771 B2* | 9/2018 | Tsao | G06F 12/0253 |
| 11,068,391 B2* | 7/2021 | Hsu | G06F 3/0689 |
| 11,321,229 B2* | 5/2022 | Pu | G06F 12/02 |
| 2014/0223075 A1 | 8/2014 | Ma et al. | |
| 2014/0281143 A1* | 9/2014 | Shivashankaraiah | G06F 12/0246 711/103 |
| 2014/0304487 A1 | 10/2014 | Hayasaka et al. | |

(Continued)

FOREIGN PATENT DOCUMENTS

| | | |
|---|---|---|
| CN | 103744798 A | 4/2014 |
| CN | 104794070 A | 7/2015 |

(Continued)

*Primary Examiner* — Christopher B Shin
(74) *Attorney, Agent, or Firm* — Conley Rose, P.C.

(57) ABSTRACT

A system controller determines a to-be-collected first logical chunk group. The first logical chunk group includes a first data logical chunk located in a first solid state disk of the plurality of solid state disks. Valid data is stored in a first logical address in the first logical chunk group, and there is a correspondence between the first logical address and an actual address in which the valid data is stored. The system controller creates a second logical chunk group. At least one second data logical chunk in the second logical chunk group is distributed in the solid state disk in which the first data logical chunk storing a valid data is located in order to ensure that the valid data is migrated from the first logical chunk group to the second logical chunk group, but an actual address of the valid data remains unchanged.

20 Claims, 7 Drawing Sheets

(56) References Cited

U.S. PATENT DOCUMENTS

| | | | |
|---|---|---|---|
| 2014/0372698 A1* | 12/2014 | Lee | G06F 11/108 |
| | | | 711/114 |
| 2015/0378884 A1 | 12/2015 | Nemazie et al. | |
| 2016/0077964 A1 | 3/2016 | Chang et al. | |
| 2016/0179422 A1* | 6/2016 | Lee | G06F 11/10 |
| | | | 711/114 |
| 2016/0196216 A1* | 7/2016 | Lee | G06F 3/0631 |
| | | | 711/170 |
| 2016/0232088 A1* | 8/2016 | Mohan | G06F 12/0246 |
| 2017/0024314 A1* | 1/2017 | Lee | G06F 12/0246 |
| 2017/0242790 A1 | 8/2017 | O'Krafka et al. | |
| 2018/0129602 A1* | 5/2018 | Hsu | G06F 12/0261 |
| 2018/0349272 A1* | 12/2018 | Xue | G06F 3/0631 |
| 2018/0364924 A1* | 12/2018 | Fukutomi | G06F 3/0617 |
| 2019/0171559 A1* | 6/2019 | Lee | G06F 12/0246 |
| 2019/0220396 A1* | 7/2019 | Lin | G06F 12/1009 |
| 2020/0117368 A1 | 4/2020 | Jiang et al. | |
| 2020/0151117 A1* | 5/2020 | Um | G06F 3/064 |
| 2021/0042225 A1* | 2/2021 | Lee | G06F 12/0607 |

FOREIGN PATENT DOCUMENTS

| | | |
|---|---|---|
| CN | 105549908 A | 5/2016 |
| CN | 106095342 A | 11/2016 |
| CN | 107391391 A | 11/2017 |
| EP | 3346387 B1 | 9/2020 |
| JP | 2014203405 A | 10/2014 |
| WO | 2014203316 A1 | 12/2014 |
| WO | 2018086075 A1 | 5/2018 |

* cited by examiner

SYSTEM GARBAGE COLLECTION METHOD AND METHOD FOR GARBAGE COLLECTION IN SOLID STATE DISK

CROSS-REFERENCE TO RELATED APPLICATIONS

This application is a continuation of International Patent Application No. PCT/CN2019/079391, filed on Mar. 23, 2019, which claims priority to Chinese Patent Application No. 201811233512.7, filed on Oct. 23, 2018 and Chinese Patent Application No. 201811064493.X, filed on Sep. 12, 2018. All of the aforementioned patent applications are hereby incorporated by reference in their entireties.

TECHNICAL FIELD

This application relates to the storage field, and more specifically, to a system garbage collection method and a method for garbage collection in a solid state disk.

BACKGROUND

A flash memory array is a storage system including a solid state disk and a system controller. The system controller allocates a logical address to a solid state disk in a unit of a logical chunk group, and when available space in the system is insufficient, the system controller performs system garbage collection. During a system garbage collection operation, the system controller instructs the solid state disk to migrate all valid data in a logical chunk group to a new logical chunk group, leading to valid data migration inside the solid state disk. Therefore, a quantity of times of write amplification is increased.

SUMMARY

This application provides a system garbage collection method and a method for garbage collection in a solid state disk in order to reduce a quantity of times of write amplification.

A first aspect provides a system garbage collection method, where the method is applied to a flash memory array, and the flash memory array includes a system controller and a plurality of solid state disks. The system controller determines a to-be-collected first logical chunk group, where the first logical chunk group includes a plurality of first data logical chunks, the plurality of first data logical chunks are distributed in different solid state disks, data stored in at least one of the plurality of first data logical chunks includes valid data, an address of the valid data in the first logical chunk is a first logical address, and there is a correspondence between the first logical address and an actual address in which the valid data is stored in a solid state disk. The system controller creates a second logical chunk group, where the second logical chunk group includes a plurality of second data logical chunks, and at least one second data logical chunk is distributed in a solid state disk in which the first data logical chunk storing the valid data is located. The system controller allocates, in the at least one second data logical chunk, a second logical address to the valid data, and then instructs the solid state disk storing the valid data to modify the correspondence between the first logical address and the actual address to a correspondence between the second logical address and the actual address.

In the system garbage collection method provided in the first aspect, the to-be-collected first logical chunk group includes the plurality of first data logical chunks, and data stored in at least one first data logical chunk is valid data. Because at least one data logical chunk in the created second logical chunk group is distributed in the solid state disk in which the first data logical chunk storing the valid data is located, the valid data does not need to be actually moved, and the valid data in the at least one data logical chunk in the to-be-collected first logical chunk group can be migrated to the created second logical chunk group only by instructing the solid state disk storing the valid data to modify the correspondence between the first logical address and the actual address to the correspondence between the second logical address and the actual address. The valid data is not actually moved, and therefore a quantity of times of write amplification can be reduced.

In the plurality of data logical chunks included in the first logical chunk group, only some data logical chunks (or even only one data logical chunk) store valid data. In this case, during creation of the second logical chunk group, it is only necessary to ensure that some data logical chunks or one data logical chunk in the second logical chunk group is distributed in the solid state disk in which a data logical chunk, storing the valid data, in the first data logical chunk group is located in order to migrate the valid data in the first logical chunk group to the second logical chunk group without actually moving the valid data. In addition, it can be understood that, even if some or all of the data logical chunks in the first logical chunk group store valid data, a quantity of times of write amplification can also be reduced to some extent provided that it is ensured that at least one data logical chunk in the created second logical chunk group is distributed in the solid state disk in which the data logical chunk, storing the valid data, in the first data logical chunk group is located.

Optionally, in another implementation, each data logical chunk included in the second logical chunk group is distributed in a solid state disk in which one data logical chunk included in the first logical chunk group is located. In this way, a quantity of times of write amplification can be furthest reduced.

In a first implementation of the first aspect, a quantity of first data logical chunks storing valid data is equal to a quantity of the at least one second data logical chunk. For example, if one first data logical chunk in the first logical chunk group stores valid data, one second data logical chunk in the second logical chunk group is also distributed in the solid state disk in which the first data logical chunk storing the valid data is located. If two first data logical chunks in the first logical chunk group store valid data, two second data logical chunks in the second logical chunk group are also respectively distributed in solid state disks in which the two first data logical chunks storing the valid data are located. If all first data logical chunks in the first logical chunk group store valid data, all second data logical chunks in the second logical chunk group are also distributed in solid state disks in which all the first data logical chunks are located.

With reference to the first implementation of the first aspect, in a second implementation of the first aspect, the creating a second logical chunk group may be further creating the second logical chunk group based on distribution of the plurality of first data logical chunks in the plurality of solid state disks, where all the second data logical chunks in the created second logical chunk group are distributed in the solid state disks in which all the first data logical chunks are located. The second logical chunk group created according to this manner can further reduce a quantity of times of write amplification.

With reference to either of the foregoing implementations, in a third implementation of the first aspect, the first logical chunk group further includes a first check logical chunk, the first check logical chunk is distributed in a solid state disk different from those in which the plurality of first data logical chunks are located, the second logical chunk group further includes a second check logical chunk, and the second check logical chunk is distributed in a solid state disk different from those in which the plurality of second data logical chunks are located. A quantity of first check logical chunks and a quantity of second check logical chunks are the same and are both determined based on a redundant arrays of independent disks (RAID) type. A solid state disk in which the second check logical chunk is located may be the same as or may be different from a solid state disk in which the first check logical chunk is located. Usually, after the valid data is migrated from the first logical chunk group to the second logical chunk group, recalculation needs to be performed and check data needs to be stored. Therefore, distribution of the second check logical chunk is not limited in this application.

With reference to any one of the foregoing implementations, in a fourth implementation of the first aspect, the to-be-collected first logical chunk group may be selected according to a specific condition. For example, when an amount of valid data included in a logical chunk group in the flash memory array is less than a specified threshold, the logical chunk group may be used as the to-be-collected first logical chunk group. Alternatively, when an amount of invalid data included in a logical chunk group in the flash memory array is greater than the specified threshold, the logical chunk group may be used as the to-be-collected first logical chunk group. Alternatively, a logical chunk group with a largest amount of invalid data or a smallest amount of valid data in the flash memory array is selected as the to-be-collected first logical chunk group. In this way, efficiency of system garbage collection can be improved.

A second aspect provides a method for garbage collection in a solid state disk, where the method is applied to the solid state disk, and the solid state disk is connected to a system controller. The solid state disk reads, from a to-be-collected first physical block, valid data and reverse mapping information of the valid data, and sends the reverse mapping information of the valid data to the system controller in order to obtain a source logical address corresponding to the reverse mapping information. Then, the solid state disk allocates a target logical address to the valid data, and copies the valid data to a second physical block, and then deletes a correspondence between the source logical address and an actual address in which the valid data is stored in the first physical block, and creates a correspondence between the target logical address and an actual address in which the valid data is stored in the second physical block. Finally, the solid state disk erases data in the first physical block.

The reverse mapping information in the second aspect may be a virtual address of the valid data, a fingerprint of the valid data, or an offset address of the valid data in a file. Any information that can be used to find the actual address of the valid data through forward indexing falls within the protection scope of this application.

Reverse mapping information of data and the data are usually written into a solid state disk as a whole, to facilitate search of a logical address of the data during garbage collection in the solid state disk, to modify a correspondence between the logical address and an actual address at a flash translation layer. In a conventional manner, reverse mapping information refers to a logical address of data. However, in this application, to maintain the actual address of the valid data unchanged, it is also necessary to ensure that an actual address of the reverse mapping information of the valid data is unchanged. When the valid data is migrated from a first logical chunk group to a second logical chunk group, a logical address of the valid data is changed. Therefore, in this application, the reverse mapping information of the valid data cannot be the logical address of the data, but may be information such as the virtual address of the data or the fingerprint of the data.

Therefore, according to the implementation of the second aspect in this application, the logical address of the valid data may be queried from the system controller based on the reverse mapping information of the valid data in order to complete garbage collection in the solid state disk.

A third aspect of this application provides a system controller, where the system controller includes an interface and a processor. The interface is configured to connect to a plurality of solid state disks, and the processor is configured to perform any method in the first aspect.

A fourth aspect of this application provides a system garbage collection apparatus, where the apparatus is located in a system controller of a flash memory array and is configured to perform any method in the first aspect.

A fifth aspect of this application provides a solid state disk, where the solid state disk includes a flash controller, a first physical block, and a second physical block. The flash controller is configured to perform the method in the second aspect.

A sixth aspect of this application provides an apparatus for garbage collection in a solid state disk configured to perform the method in the second aspect.

A seventh aspect of this application provides a flash memory array, where the flash memory array includes a system controller and a solid state disk, the system controller is configured to perform any method in the first aspect, and the solid state disk is configured to perform the method in the second aspect.

An eighth aspect of this application provides a computer program product for system garbage collection, including a computer readable storage medium storing program code, where an instruction included in the program code is used to perform the method described in the first aspect.

A ninth aspect of this application provides a computer program product for garbage collection in a solid state disk, including a computer readable storage medium storing program code, where an instruction included in the program code is used to perform the method described in the second aspect.

DESCRIPTION OF EMBODIMENTS

The embodiments of the present disclosure provide a system garbage collection method and a storage system in order to reduce a quantity of times of write amplification, thereby improving a service life of a solid state disk.

Figure 1:
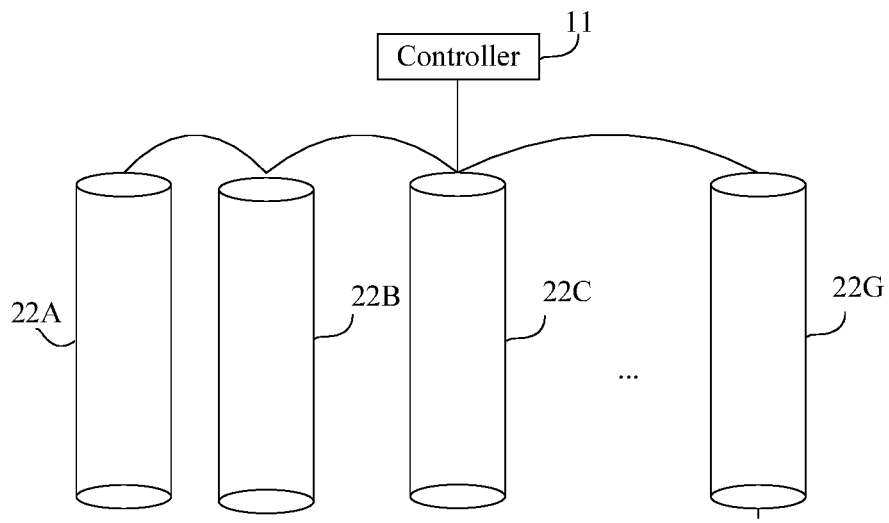
FIG. 1 is an application scenario diagram according to an embodiment of the present disclosure.

FIG. 1 is a constitutional diagram of a flash memory array according to an embodiment of the present disclosure. The flash memory array shown in FIG. 1 includes at least one controller (a controller 11 shown in FIG. 1) and a plurality of solid state disks 22 (a solid state disk 22A, a solid state disk 22B, a solid state disk 22C, and a solid state disk 22G that are shown in FIG. 1). The controller 11 is connected to a host (not shown in the figure) through a storage area network (SAN). The controller 11 may be a computing device such as a server and a desktop computer. An operating system and an application are installed in the controller 11. The controller 11 may receive an input/output (I/O) request from the host. The controller 11 may further store data (if exists) carried in the I/O request, and write the data into the solid state disk 22. A solid-state disk (SSD) is a memory using a flash memory chip as a medium, and is also referred to as a solid-state drive.

FIG. 1 is only used for example description. In practice, a storage system may include two or more controllers, and each controller has a similar physical structure and a function to those of the controller 11. In addition, a connection manner between controllers and a connection manner between any controller and the solid state disk 22 are not limited in this embodiment, provided that intercommunication can be performed between the controllers and between each controller and the solid state disk 22. In addition, in this embodiment, the controller 11 often sends instructions to a plurality of solid state disks. For ease of description, a set including a plurality of solid state disks 22 is referred to as a solid state disk group.

Figure 2:
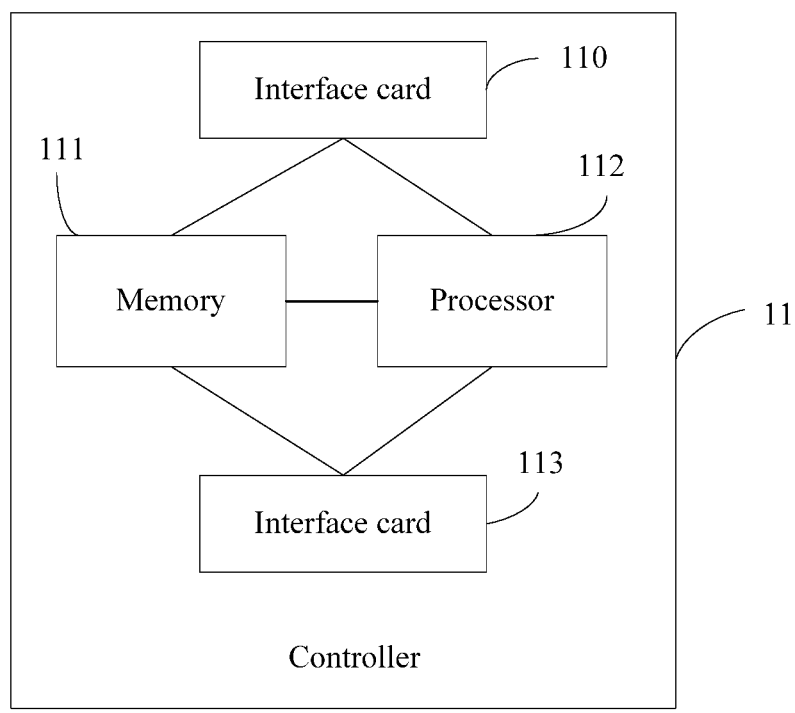
FIG. 2 is a structural diagram of a controller according to an embodiment of the present disclosure.

FIG. 2 is an example structural diagram of the controller 11. As shown in FIG. 2, the controller 11 includes an interface card 110, a processor 112, and an interface card 113.

The interface card 110 is configured to communicate with the host, and the controller 11 may receive an operation instruction of the host through the interface card 110. The processor 112 may be a central processing unit (CPU). In this embodiment of the present disclosure, the processor 112 may be configured to receive an I/O request from the host and process the I/O request. The I/O request may be a data write request or a data read request, and the processor 112 may further send data in the data write request to the solid state disk 22. In addition, the processor 112 may be further configured to perform a system garbage collection operation. The interface card 113 is configured to communicate with the solid state disk 22, and the controller 11 may send, through the interface card 113, the data write request (including the data, a logical address of the data, and a virtual address of the data) to the solid state disk 22 for storage.

Optionally, the controller 11 may further include a memory 111. The memory 111 is configured to temporarily store data received from the host or data read from the solid state disk 22. When receiving a plurality of data write requests sent by the host, the controller 11 may temporarily store data in the plurality of data write requests in the memory 111. When a size of the memory 111 reaches a specific threshold, the data stored in the memory 111, a virtual address of the data, and a logical address allocated to the data are sent to the solid state disk 22. The solid state disk 22 stores the data. The memory 111 includes a volatile memory, a flash memory chip, or a combination thereof. The volatile memory is, for example, a random-access memory (RAM). The flash memory chip is, for example, various machine-readable media that can store program code, such as a floppy disk, a hard disk, a solid state disk, and an optical disc. The memory 111 has a function of protecting data when a power failure occurs, and the function of protecting data when a power failure occurs means that the data stored in the memory 111 is not lost when a system is powered on again after the power failure occurs.

After data is written into the flash memory array, the controller 11 needs to record validity of the data. The validity of the data is determined based on whether the data is modified. If the data is written for the first time, the data may be recorded as valid (referred to as valid data). If the data is modified, the data before modification is recorded as invalid (referred to as invalid data). Specifically, a bitmap may be used to record validity of data. For example, each "bit" of the bitmap corresponds to a logical address of data whose size is 1 kilobytes (kB). When the "bit" is 1, it indicates that the data stored in the logical address is valid, and when the "bit" is 0, it indicates that the data stored in the logical address is invalid. The bitmap may be stored in the memory 111 or may be stored in a solid state disk.

It should be noted that, the controller 11, as a system controller, is an independent device, which is different from a control chip in a solid state disk. In this embodiment, the control chip in the solid state disk is referred to as a flash controller.

The solid state disk 22 includes a flash controller and a plurality of flash memory chips. The flash controller is configured to perform an operation such as execution of a data write request or a data read request sent by the controller 11. The flash controller may be a processor located inside the solid state disk 22 or may be a field programmable gate array (FPGA) located outside the solid state disk 22.

The flash controller includes a flash translation layer (FTL). The flash translation layer is configured to store a correspondence between a logical address and an actual address of data. Therefore, the flash translation layer is configured to translate a logical address into an actual address of data in a solid state disk, the logical address in a data write request or a data read request being sent by the system controller. The logical address of the data is allocated by the system controller, and is a subset of a logical address interval provided by the solid state disk to the system controller. The logical address of the data includes a start logical address and a length, where the start logical address indicates a location of the data in a logical chunk group, and the length indicates a size of the data. The actual address of the data may be a physical address of the data in the solid state disk, or may be an address obtained by virtualizing the physical address and that is visible only to the flash controller. The actual address obtained through virtualization is invisible to the system controller. Generally, the physical address includes a block number of a physical block and a page number of a page in which the data exists.

The solid state disk generally includes one or more flash memory chips. Each flash memory chip includes several physical blocks (which may be referred to as "blocks"). The solid state disk performs reading or writing based on a page, but performs an erasure operation based only on a physical block. The erasure operation means setting all bits of the block to "1". Before erasure is performed, the flash controller needs to previously copy valid data in the physical block to a blank page of another block.

Each physical block includes a plurality of pages. During execution of a data write request, the solid state disk writes data in a unit of a page. For example, the controller 11 sends a data write request to the flash controller. The data write request includes a logical address of data. After receiving the data write request, the flash controller continuously writes the data into one or more physical blocks according to a receiving time sequence. Continuously writing the data into one or more physical blocks means that the flash controller searches for a blank physical block, writes the data into the blank physical block until the blank physical block is filled with the data. When a size of the data exceeds a capacity of the physical block, the flash controller searches for a next blank physical block to continue writing. The flash translation layer establishes and stores a correspondence between the logical address and an actual address of a page into which the data is written. When the controller 11 sends a data read request to the flash controller to request to read the data, the data read request includes the logical address. The flash controller reads the data based on the logical address and the correspondence between the logical address and the actual address, and sends the data to the controller 11.

In the flash memory array, a fault possibly occurs on a single solid state disk, resulting in a data loss. In this embodiment, a RAID technology is used to ensure independent of data. The following describes a mechanism of redundancy protection for data in a solid state disk.

First, the controller 11 performs space management on the solid state disk in a unit of a logical chunk (CK). The logical chunk is a space concept. For example, a size of the logical chunk is 4 megabyte (MB), but is not limited to 4 MB. Logical chunks from different solid state disks may form a logical chunk set, and the controller 11 then divides the logical chunks in the logical chunk set into a data logical chunk group and a check logical chunk group according to a specified RAID type. The data logical chunk group includes at least two logical chunks, which are configured to store data, and the check logical chunk group includes at least one check logical chunk, which are configured to store check data of the data. In this embodiment, the logical chunk set including the data logical chunk group and the check logical chunk group is referred to as a logical chunk group. When the memory 111 is filled with data of a specific size, the controller 11 may divide the data into a plurality of data units based on the specified RAID type. The controller performs calculation on the plurality of data units to obtain a check unit. The data units and the check unit are then sent to the solid state disk and to be stored in the logical chunk group. Each logical chunk in the data group is used to store a data unit, and each logical chunk in the check group is used to store a check unit. After storage, these data units and the corresponding check unit form a stripe. The logical chunk group includes a plurality of stripes.

Figure 3:
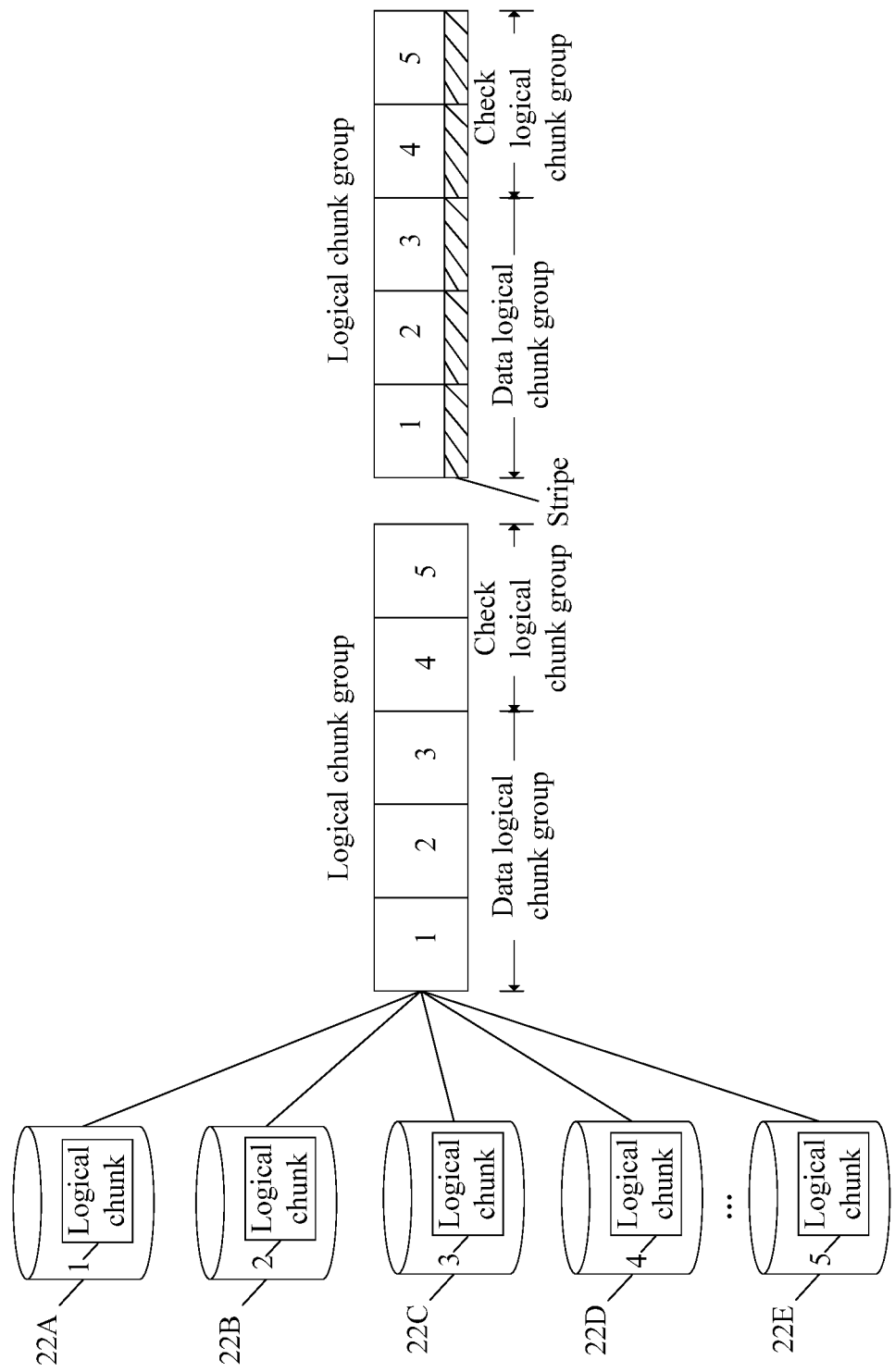
FIG. 3 is a schematic diagram of a logical chunk group according to an embodiment of the present disclosure.

Each of the data unit and the check unit included in the stripe may be referred to as a stripe unit. In this embodiment, for example, a size of the stripe unit is 8 KB, but is not limited to 8 KB. As shown in FIG. 3, it is assumed that one logical chunk is selected from each of five solid state disks to form a logical chunk set, and then the controller 11 groups the logical chunks in the logical chunk set based on a RAID type (a RAID6 is used as an example). For example, a logical chunk 1, a logical chunk 2, and a logical chunk 3 are in a data logical chunk group, and a logical chunk 4 and a logical chunk 5 are in a check logical chunk group. When a size of data stored in the memory 111 reaches 24 KB (8 KB*3), the data is divided into three data units, and a size of each data unit is 8 KB. Then, two check units are obtained through calculation, and a size of each check unit is also 8 KB. The controller 11 sends these data units and check units to the solid state disk, and stores the data units and check units in the logical chunk group (shown by a shaded portion in FIG. 3). It can be understood that, according to a redundancy protection mechanism of the RAID6, when any two data units or check units become invalid, an invalid unit may be reconstructed based on remaining data units or check units.

Figure 4:
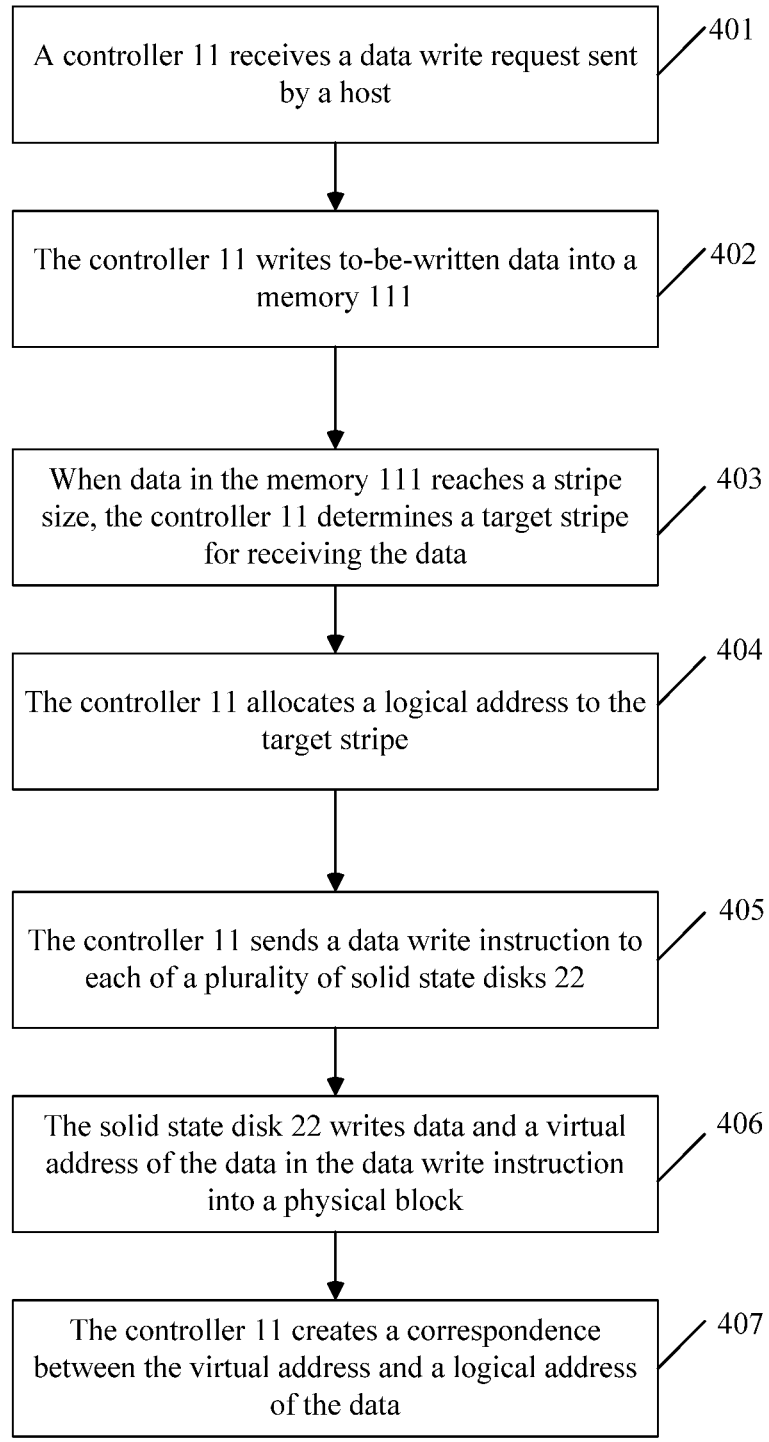
FIG. 4 is a schematic flowchart of writing data according to an embodiment of the present disclosure.

With reference to FIG. 4, an embodiment of the present disclosure provides a data write method. The method may be applied to the flash memory array shown in FIG. 1, and may be performed by the processor 112 of the controller 11 shown in FIG. 2 or the solid state disk 22. As shown in FIG. 4, the method includes the following steps.

401. The controller 11 receives a data write request sent by a host, where the data write request includes to-be-written data and a virtual address of the to-be-written data. The controller 11 provides its storage space to the host in a form of a logical unit (LU). There is a binding relationship between the host and one or more logical units. When a user sends the to-be-written data to the controller 11 using the host, the virtual address for storing the data usually needs to be specified. Specifically, the virtual address is an identifier of the logical unit and an offset address of the logical unit in which the data is located.

402. The controller 11 writes the to-be-written data into a memory 111.

403. When data in the memory 111 reaches a stripe size, the controller 11 determines a target stripe for receiving the data. A stripe is a subset of the logical chunk group shown in FIG. 3, and a logical address of the target stripe is a subset of logical addresses of a logical chunk group in which the target stripe is located. The stripe size herein is actually a size of all data units in the stripe. Then, the controller 11 obtains check data of the data through calculation. The data and the check data together form a stripe.

404. The controller 11 allocates a logical address to the target stripe. It should be understood that, the logical address herein is different from the virtual address in 401. The virtual address is an address that is visible to the controller 11 and the host but is invisible to the solid state disk 22, while the logical address in 404 is an address that is visible to the controller 11 and the solid state disk 22 but is invisible to the host.

The controller 11 needs to determine whether there is an allocated logical chunk group. If there is an allocated logical chunk group and the logical chunk group still has enough space for accommodating the data, the controller 11 may instruct the plurality of solid state disks to write the data into the allocated logical chunk group. Specifically, the controller 11 obtains a segment of unused logical address from a logical address interval of the allocated logical chunk group. And in 405, the controller adds the logical address to the data write request and sends the data write request to the solid state disk 22. If the controller 11 determines that there is no allocated logical chunk group in a system, or that all allocated logical chunk groups are filled with data, the controller 11 needs to create a new logical chunk group. A creation process of the new logical chunk group may be as follows. The controller 11 determines, based on an available-space record about each solid state disk stored in the controller 11, that remaining space in the system is sufficient for creating a new logical chunk group. Next, the controller 11 obtains one logical chunk from each of different solid state disks 22, and constructs these logical chunks into a new logical chunk group (referring to the description about the logical chunk group in FIG. 3) based on a specified RAID type. Then, the controller 11 allocates a segment of logical address to each logical chunk, and a set of these logical addresses is a logical address of the new logical chunk group. In the logical address of the new logical chunk group, the controller 11 may obtain a segment of the logical address as the logical address of the target stripe.

405. The controller 11 sends a data write instruction to each of a plurality of solid state disks 22. Because the data in the target stripe should be distributed in a plurality of solid state disks, a data write instruction needs to be sent to each solid state disk 22 of the plurality of solid state disks. A quantity of the solid state disks 22 receiving the data write instructions depends on a RAID type. For example, the RAID type is 3+2 (three data units and two check units). In this case, the data in the target stripe is distributed in five solid state disks. Therefore, the controller 11 needs to generate five data write instructions, and each data write instruction is sent to one of the five solid state disks. Each data write instruction carries a part of the data or a part of the check data, a logical address of the part of the data or the part of the check data, and a virtual address of the part of the data or the part of the check data. It should be understood that, the logical address in each data write instruction is a subset of the logical address allocated to the target stripe, and the virtual address in each data write instruction is from the data write request sent by the host.

406. Each solid state disk 22 receiving the data write instruction writes data and a virtual address of the data in the data write instruction into a physical block. Optionally, the data write instruction may be a custom command to ensure that the data and the virtual address are written into a same physical block. An address of the block in which the data is located is referred to as an actual address (including a block number of the physical block and a page number in which the data is located), and after writing, the solid state disk 22 stores, at a flash translation layer, a correspondence between the logical address and the actual address of the data.

The virtual address that is written into the physical block together with the data is also referred to as reverse mapping information, and the reverse mapping information enables the solid state disk 22 to obtain the logical address of the data based on the virtual address of the data during execution of in-disk garbage collection. And the logical address of the data can be found from the flash translation layer and modified to a new logical address.

407. After the solid state disk 22 successfully writes the data into the block, the controller 11 creates a correspondence between the virtual address and the logical address of the data. Subsequently, if the host sends a data read request to read the data in the virtual address, the controller 11 may read the data from the solid state disk 22 based on the correspondence between the virtual address and the logical address.

In other approaches, reverse mapping information that is written into a physical block together with data is a logical address of the data. As the logical address of the data describes a location of the data in a logical chunk group, the logical address of the data changes when the data is migrated from one logical chunk group to another logical chunk group. In this case, this also means that, data information including the data and the logical address of the data changes. In this embodiment, in a system garbage collection process, to change only a logical chunk group to which data information belongs without actually moving data, the system controller writes the data and a virtual address of the data, rather than a logical address, into a physical block during data writing. This is because the virtual address of the data does not change during this process.

In an implementation shown in FIG. 4, the reverse mapping information is the virtual address of the data. When the data is migrated between logical chunk groups, the virtual address of the data does not change. Optionally, in another implementation, the reverse mapping information is a fingerprint of the data, where the fingerprint is a result obtained by performing a hash operation on the data. Alternatively, the reverse mapping information is an offset address of the data in a file. Optionally, in a flash memory array with a key-value interface, the data write request sent by the host to the controller 11 includes a key of the to-be-written data instead of the virtual address. The key is obtained by performing calculation using the virtual address. In this case, the reverse mapping information is the key of the to-be-written data. Correspondingly, in 407, the controller 11 creates a correspondence between the key and the logical address of the data information. Optionally, in a flash memory array with a log interface, the data write request sent by the host to the controller 11 includes a log address of the to-be-written data instead of the virtual address. In this case, the reverse mapping information is the log address of the to-be-written data. Correspondingly, in 407, the controller 11 creates a correspondence between the log address and the logical address of the data information. In general, the reverse mapping information in this embodiment of the present disclosure is any information that can be used to find the actual address of the data through forward indexing, and is not limited to the various cases listed above. When the data is migrated between logical chunk groups, the information does not change. In the following description, a virtual address is still used as an example in this embodiment. If the reverse mapping information is other information that can be used to find the actual address of the data through forward indexing, an operation manner thereof is similar to that described in the foregoing.

To ensure that in the flash memory array, there is always enough available space for creating a logical chunk group, the controller 11 may monitor available space of each solid state disk 22 in real time or periodically in order to learn of available space of the entire system. When a size of the available space of the system is less than a specified space threshold, system garbage collection is started. For example, a capacity of a solid state disk 22 is 128 gigabytes (GB), a total capacity of all solid state disks (it is assumed that the flash memory array includes 10 solid state disks) included in the flash memory array shown in FIG. 1 is 1280 GB, and the space threshold may be set to 640 GB. In other words, when a size of data stored in the flash memory array reaches a half of the total capacity, a size of remaining available space also reaches the space threshold. In this case, the controller 11 may perform system garbage collection. It can be understood that, 640 GB is only an example of the space threshold, and the space threshold may alternatively be set to another value. In addition, when used space of the system reaches the specified space threshold, system garbage collection may also be triggered. System garbage collection is different from garbage collection within a solid state disk. Garbage collection within a solid state disk is completed by the solid state disk itself.

Generally, the controller 11 performs system garbage collection in a unit of a logical chunk group. For example, the controller 11 obtains a logical address of valid data in a logical chunk group based on a bitmap, and sends the logical address of the valid data to a solid state disk group such that each solid state disk 22 can read the data based on the logical address of the valid data and send the data to the controller 11. The controller 11 allocates a new logical address to the valid data, where the new logical address belongs to a new logical chunk group. The controller 11 then sends the allocated new logical address to the solid state disk group, each solid state disk 22 storing a mapping relationship between an actual address and the new logical address after writing the valid data into a new physical block. Then, the controller 11 further sends an unmap command or a trim command to the solid state disk group, where the unmap command includes a logical address interval of a to-be-collected logical chunk group. After receiving the unmap command, each solid state disk 22 deletes a correspondence between a logical address of the logical address interval and an actual address, which is stored at the flash translation layer. The solid state disk 22 may further mark a block as an invalid block that does not include valid data, because data stored in the block have been migrated. The solid state disk 22 may also directly erase a block that does not include valid data. Subsequently, the controller 11 may release the logical address interval of the to-be-collected logical chunk group and actual physical space occupied by the logical chunk group (which may also be understood as an actual address).

It can be learned that, system garbage collection leads to data migration between physical blocks, and a quantity of times of write amplification is increased. This embodiment of the present disclosure provides a system garbage collection method in order to complete migration of valid data between logical chunk groups in a system garbage collection process without actually moving the data in order to reduce a quantity of times of write amplification.

Figure 5:
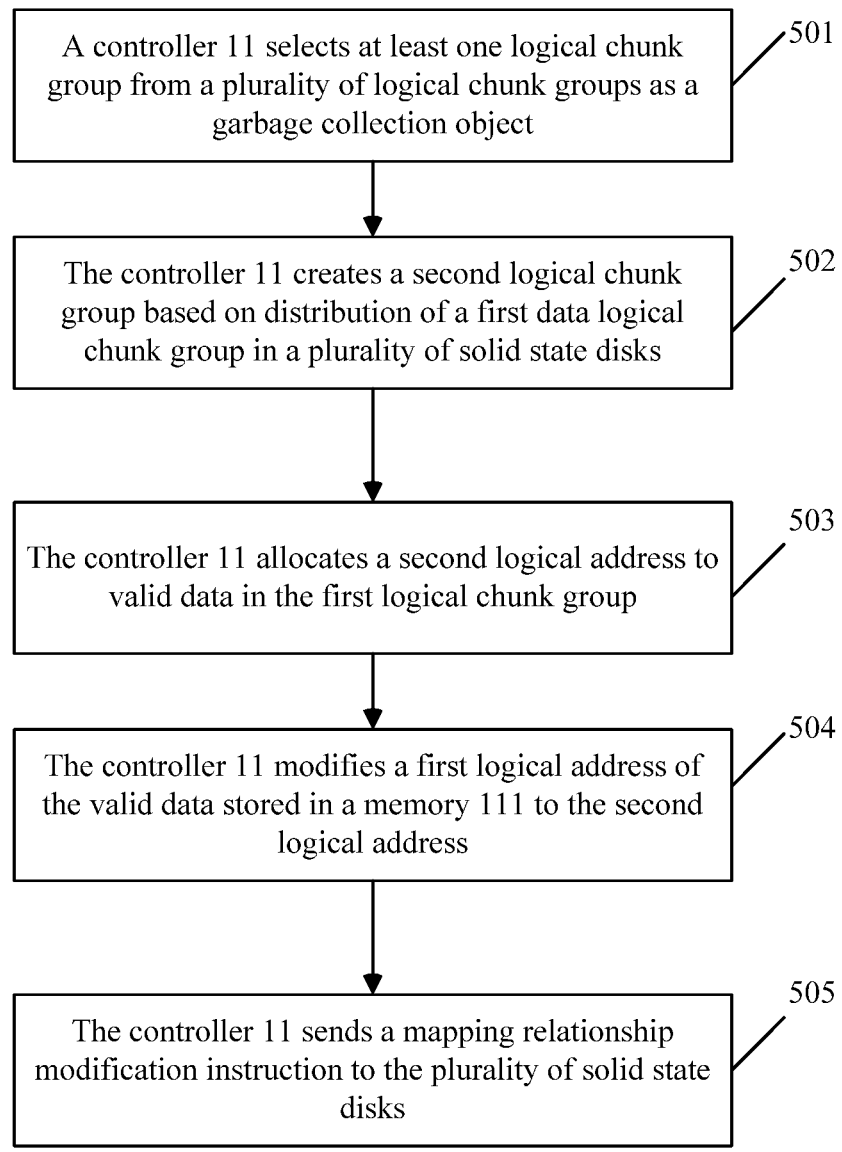
FIG. 5 is a schematic flowchart of a system garbage collection method according to an embodiment of the present disclosure.
Figure 6:
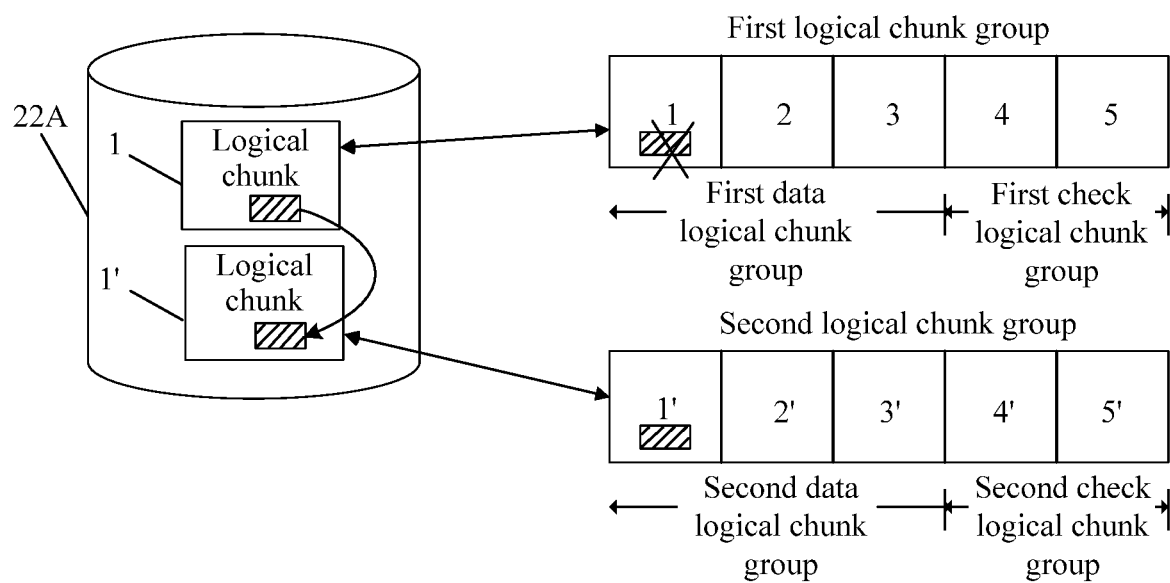
FIG. 6 is a schematic diagram of a system garbage collection method according to an embodiment of the present disclosure.

With reference to FIG. 5 and FIG. 6, an embodiment of the present disclosure provides a system garbage collection. The method may be applied to the flash memory array shown in FIG. 1 and may be performed by the processor 112 of the controller 11 shown in FIG. 2. FIG. 5 is a schematic flowchart of a system garbage collection method according to this embodiment of the present disclosure, and FIG. 6 is a schematic diagram of implementing data migration between two logical chunk groups. As shown in FIG. 5, the method includes the following steps.

501. When there is insufficient free space in a storage system, the controller 11 selects at least one logical chunk group from a plurality of logical chunk groups as a garbage collection object. The selected logical chunk group needs to satisfy a specific condition. For example, an amount of invalid data included in the logical chunk group reaches a first specified threshold, or the logical chunk group is a logical chunk group that includes a largest amount of invalid data in the plurality of logical chunk groups, or an amount of invalid data included in the logical chunk group is less than a second specified threshold, or the logical chunk group is a logical chunk group that includes a smallest amount of invalid data in the plurality of logical chunk groups. An amount of invalid data or valid data may be calculated based on the bitmap described above. For ease of description, in this embodiment, the selected logical chunk group on which garbage collection is to be performed is referred to as a first logical chunk group.

It can be learned from descriptions of logical chunk groups in FIG. 3 and FIG. 6 that, the first logical chunk group includes a first data logical chunk group and a first check logical chunk group. The first data logical chunk group includes at least two data logical chunks and is configured to store data. The first check logical chunk group includes at least one logical chunk and is configured to store check data. Each data logical chunk included in the first data logical chunk group and each check logical chunk included in the first check logical chunk group are from different solid state disks.

The first logical chunk group includes valid data and invalid data. Generally, in a system garbage collection process, the valid data in the first logical chunk group needs to be migrated to a new logical chunk group, and then the first logical chunk group needs to be released. In this embodiment, a location of the valid data in the first logical chunk group is a first logical address. There is a correspondence between the first logical address and an actual address in which the valid data is stored in a solid state disk.

502. The controller 11 creates a second logical chunk group based on distribution of the first data logical chunk group in the plurality of solid state disks. The second logical chunk group is a logical chunk group receiving the valid data in the first logical chunk group. A RAID type of the created second logical chunk group is the same as a RAID type of the first logical chunk group, and therefore the second logical chunk group includes a second data logical chunk group and a second check logical chunk group, where a quantity of data logical chunks included in the second data logical chunks is the same as a quantity of data logical chunks included in the first data logical chunk group, and a quantity of check logical chunks included in the second check logical chunk group is the same as a quantity of check logical chunks included in the first check logical chunk group. In addition, distribution of the second data logical chunk group in the plurality of solid state disks is the same as the distribution of the first data logical chunk group in the plurality of solid state disks. For example, a logical chunk 1, a logical chunk 2, and a logical chunk 3 that are included in the first data logical chunk group are respectively located in a solid state disk 22A, a solid state disk 22B, and a solid state disk 22C. Based on distribution of the logical chunk 1, the logical chunk 2, and the logical chunk 3 in these solid state disks, the controller 11 obtains one data logical chunk from each of the solid state disk 22A, the solid state disk 22B, and the solid state disk 22C, to create a second logical chunk group. In other words, a logical chunk 1', a logical chunk 2', and a logical chunk 3' in the second logical chunk group are also respectively located in the solid state disk 22A, the solid state disk 22B, and the solid state disk 22C. As shown in FIG. 6, the logical chunk 1 included in the first logical chunk group is distributed in the solid state disk 22A. To create the second logical chunk group, the controller 11 obtains the logical chunk 1' from the solid state disk 22A. Similarly, for the data logical chunk 2 and the data logical chunk 3 included in the first logical chunk group, the controller 11 also obtains the data logical chunk 2' and the data logical chunk 3' from corresponding solid state disks based on distribution of the data logical chunk 2 and the data logical chunk 3 in the solid state disks.

However, in this embodiment, the controller 11 is not required to create a second check logical chunk group based on distribution of the first check logical chunk group in the plurality of solid state disks. Actually, the controller 11 may freely select, from the plurality of solid state disks, a solid state disk providing a check logical chunk, provided that the solid state disk is not the same as a solid state disk providing a data logical chunk. This is because check data stored in a second check logical chunk generally needs to be obtained through recalculation without being directly obtained from a first check logical chunk through migration.

In 502, each data logical chunk included in the second logical chunk group is distributed in a solid state disk in which one data logical chunk included in the first logical chunk group is located. However, in another implementation, a quantity of times of write amplification can also be reduced to some extent, provided that it is ensured that at least one data logical chunk in the second logical chunk group is distributed in a solid state disk in which a data logical chunk, storing valid data, in the first logical chunk group is located. In addition, it can be understood that, data stored in a data logical chunk included in the first data logical chunk group may be valid data or may be invalid data. In other words, in the plurality of data logical chunks, only some data logical chunks (even only one data logical chunk) possibly store valid data. In this case, during creation of the second logical chunk group, garbage collection may be performed on the first logical chunk group, provided that it is ensured that some data logical chunks or one data logical chunk in the second logical chunk group are/is distributed in a solid state disk in which a data logical chunk, storing valid data, in the first data logical chunk group is located.

503. The controller 11 allocates a second logical address to valid data in the first logical chunk group. For example, for the valid data, refer to a small shaded box in a logical chunk 1 shown in FIG. 6. It should be noted that, the small shaded box shown in FIG. 6 is only a part of the valid data in the first logical chunk group, and the valid data may alternatively be distributed in a data logical chunk 2 and a data logical chunk 3. The allocated second logical address is a subset of a logical address of the second logical chunk group. The second logical chunk group created in 502 not only may be used to store valid data in one logical chunk group, but also may be used to store valid data in a plurality of logical chunk groups.

504. The controller 11 modifies a first logical address of the valid data stored in a memory 111 to the second logical address. During conventional system garbage collection, the controller 11 needs to read the valid data from the first logical chunk group and rewrite the valid data into the second logical chunk group. This means that the valid data is moved between physical blocks of a solid state disk, and correspondingly, both a logical address and an actual address of the valid data change. However, in this embodiment, to migrate the valid data from the first logical chunk group to the second logical chunk group, only the logical address of the valid data needs to be modified (the first logical address in the first logical chunk group is modified to the second logical address in the second logical chunk group), and a location in which the valid data is actually stored in the solid state disk is not changed. In other words, in this embodiment, only the logical address of the valid data needs to be changed without changing the actual address of the valid data. For example, before performing system garbage collection on the first logical chunk group, the controller 11 stores a correspondence between the virtual address and the first logical address of the valid data. In 504, the controller 11 may modify the correspondence between the virtual address and the first logical address of the valid data to a correspondence between the virtual address and the allocated second logical address.

505. The controller 11 sends mapping relationship modification instructions to the plurality of solid state disks, where the mapping relationship modification instructions are used to instruct the plurality of solid state disks to modify the correspondence between the first logical address and the actual address of the valid data to the correspondence between the second logical address and the actual address. In 504, the controller 11 changes the logical address of the valid data, and the change of the logical address further needs to be notified to the solid state disk, to ensure that logical addresses of the valid data stored in the controller 11 and the solid state disk 22 are consistent in order to facilitate future reading of the valid data. It can be understood that, because each of the plurality of solid state disks stores a part of valid data, the controller 11 needs to send a mapping relationship modification instruction to each solid state disk in order to instruct the solid state disk to modify a correspondence of the part of valid data stored in the solid state disk.

It can be understood that, if only one first data logical chunk in the first logical chunk group includes valid data, and only one solid state disk in which one second data logical chunk in the created second logical chunk group is located is the same as a solid state disk in which the first data logical chunk storing the valid data is located, the controller 11 only needs to send a mapping relationship modification instruction to the solid state disk in which the first data logical chunk including the valid data is located. Similarly, if a specific quantity (greater than or equal to 2) of first data logical chunks in the first logical chunk group include valid data, and solid state disks in which the same quantity of second data logical chunks in the created second logical chunk group are located are the same as the solid state disk in which the first data logical chunk storing the valid data is located, the controller 11 only needs to send mapping relationship modification instructions to the solid state disks storing the valid data.

In another case, N (N is an integer greater than or equal to 2) first data logical chunks in the first logical chunk group include valid data, and solid state disks in which M (M is an integer greater than or equal to 1) second data logical chunks in the created second logical chunk group are located are the same as solid state disks in which some of the N first data logical chunks are located, where M is less than N. In this case, the controller 11 only needs to send mapping relationship modification instructions to solid state disks in which M first data logical chunks are located.

The system garbage collection method shown in FIG. 5 may be implemented in the entire flash memory array or is applicable to a partial area of the flash memory array. For example, logical addresses provided by the plurality of solid state disks 22 to the controller 11 may be divided into two sets. The manner provided in this embodiment of the present disclosure is used for system garbage collection to a first set, and a conventional manner is used for system garbage collection to a second set.

After all valid data in the first logical chunk group is migrated to the second logical chunk group, all the data in the first logical chunk group becomes invalid data. In this case, the controller 11 may change the data in the first logical chunk group to invalid data information (for example, a logical address in the first logical chunk group) and transmit the invalid data information to the solid state disks 22 in which the first logical chunk group is distributed, and the solid state disk 22 marks the invalid data in a physical block based on the information, and when performing garbage collection in the solid state disk 22, the solid state disk 22 may directly reclaim the physical block including the invalid data without migrating the valid data again.

Figure 7:
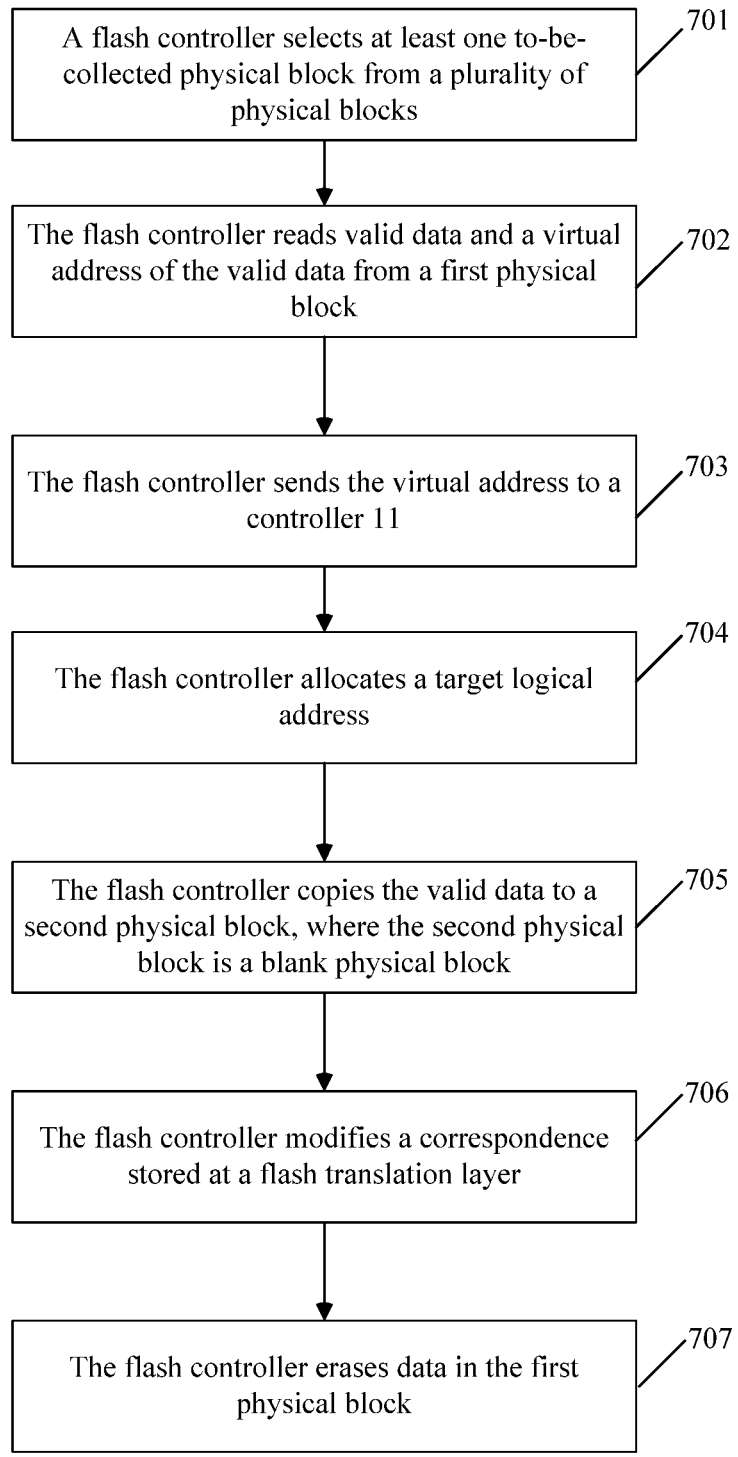
FIG. 7 is a schematic flowchart of a method for garbage collection in a solid state disk according to an embodiment of the present disclosure.

In the implementation shown in FIG. 5, a system garbage collection process is described. It can be learned from the foregoing description that, system garbage collection is triggered and completed by the controller 11. However, the solid state disk 22 may further perform garbage collection in the solid state disk 22, and tentatively, garbage collection in the solid state disk is referred to as in-disk garbage collection. Most operations of in-disk garbage collection are completed by a flash controller, and in a few cases, the controller 11 is required for cooperation with the flash controller. FIG. 7 is a schematic flowchart of an in-disk garbage collection method according to an embodiment of the present disclosure, and the method includes the following steps.

701. When there are insufficient free physical blocks in a solid state disk 22, a flash controller of the solid state disk 22 selects at least one to-be-collected physical block from a plurality of physical blocks. The solid state disk 22 is any solid state disk shown in FIG. 1. The selected physical block needs to satisfy a specific condition. For example, an amount of invalid data included in the physical block reaches a third specified threshold, or the physical block is a physical block that includes a largest amount of invalid data in the plurality of physical blocks, or an amount of invalid data included in the physical block is less than a fourth specified threshold, or the physical block is a physical block that includes a smallest amount of invalid data in the plurality of physical blocks. For ease of description, in this embodiment, the selected physical block on which garbage collection is to be performed is referred to as a first physical block.

An amount of invalid data or valid data may be calculated based on a bitmap in the solid state disk 22. The solid state disk 22 stores a bitmap, and the bitmap is shown in Table 1 and is used to describe validity of data stored in an actual address.

| Actual address | Validity | Actual address | Validity |
|---|---|---|---|
| Block0, page0 | 0 | Block1, page0 | 0 |
| Block0, page1 | 0 | Block1, page1 | 1 |
| Block0, page2 | 1 | Block1, page2 | 1 |
| ... | ... | ... | ... |
| Block0, pageN | 0 | Block1, pageN | 0 |

"0" indicates that data stored in the address is invalid data, and "1" indicates that data stored in the address is valid data. Based on the bitmap, the solid state disk 22 may obtain an amount of valid data or invalid data of each physical block in order to select the to-be-collected first physical block.

702. The flash controller reads valid data and a virtual address of the valid data from the first physical block. An actual address in which the valid data is stored can be learned from Table 1, for example, block0 and page2. Then, the solid state disk 22 reads the stored valid data from the actual address. Because the virtual address of the data and the data are stored as a whole, the virtual address of the valid data may be read during reading of the valid data.

703. The flash controller sends the virtual address to a controller 11. If a conventional manner is used, a logical address of the valid data is stored together with the valid data, and therefore the solid state disk 22 may directly obtain the logical address of the valid data. However, in this embodiment, because the solid state disk 22 stores the virtual address of the valid data instead of the logical address, the solid state disk 22 needs to send the virtual address to the controller 11 to query for the logical address of the valid data.

In 703. The flash controller receives the logical address corresponding to the virtual address sent by the controller 11. A correspondence between the virtual address and the logical address is stored in the controller 11. For example, the logical address herein may be the second logical address in the embodiment shown in FIG. 5 or may be referred to as a source logical address.

704. The flash controller allocates a target logical address.

705. The flash controller copies the valid data to a second physical block, where the second physical block is a blank physical block. Because the valid data and the virtual address of the valid data are stored as a whole, the flash controller also copies the virtual address of the valid data to the second physical block when copying the valid data to the second physical block.

706. After copying is completed, the flash controller modifies a correspondence stored at a flash translation layer. Specifically, the flash controller deletes a correspondence between the source logical address and an actual address in which the valid data is stored in the first physical block, and creates a correspondence between the target logical address and an actual address in which the valid data is stored in the second physical block.

707. Erase data in the first physical block.

In a same manner, the solid state disk 22 may select another physical block as a garbage collection object, and repeatedly perform 701 to 707 in order to complete garbage collection in the entire solid state disk 22.

In the description shown in FIG. 7, the virtual address is used as an example in this embodiment. However, it can be understood that, the virtual address may be replaced with reverse mapping information in another form. In this case, an operation manner of in-disk garbage collection is similar to the manner described in FIG. 7, and details are not repeated herein.

In addition, this embodiment is further applicable to another storage system, and the storage system includes a system controller and a plurality of shingled magnetic recording (SMR) disks. The storage system may also perform the method processes shown in FIG. 4, FIG. 5, and FIG. 7, and only a solid state disk needs to be replaced with a shingled magnetic recording disk. Details are not repeated herein.

Figure 8:
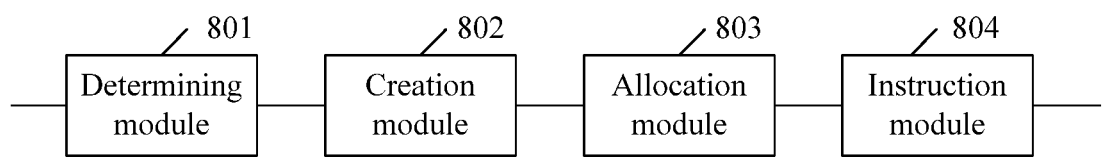
FIG. 8 is a schematic structural diagram of a system garbage collection apparatus according to an embodiment of the present disclosure.

FIG. 8 is a schematic structural diagram of a system garbage collection apparatus according to an embodiment of the present disclosure. The apparatus is located in a controller 11 of a flash memory array. As shown in FIG. 8, the apparatus includes a determining module 801, a creation module 802, an allocation module 803, and an instruction module 804.

The determining module 801 is configured to determine a to-be-collected first logical chunk group, where the first logical chunk group includes a plurality of first data logical chunks, the plurality of first data logical chunks are distributed in different solid state disks included in the flash memory array, data stored in at least one of the plurality of first data logical chunks includes valid data, a location of the valid data in the first logical chunk is a first logical address, and there is a correspondence between the first logical address and an actual address in which the valid data is stored in a solid state disk. A function of the module may be separately performed by a processor 112 or may be performed by the processor 112 by calling a program in a memory 111. For details, refer to step 501 shown in FIG. 5 and the related description of step 501. Details are not repeated herein.

The creation module 802 is configured to create a second logical chunk group, where the second logical chunk group includes a plurality of second data logical chunks, and at least one second data logical chunk is distributed in a solid state disk in which the first data logical chunk storing the valid data is located. A function of the module may be separately performed by the processor 112 or may be performed by the processor 112 by calling a program in the memory 111. For details, refer to step 502 shown in FIG. 5 and the related description of step 502. Details are not repeated herein.

The allocation module 803 is configured to allocate, in the second logical chunk distributed in the solid state disk in which the first logical chunk storing the valid data is located, a second logical address to the valid data. A function of the module may be separately performed by the processor 112 or may be performed by the processor 112 by calling a program in the memory 111. For details, refer to step 503 shown in FIG. 5 and the related description of step 503. Details are not repeated herein.

The instruction module 804 is configured to instruct the solid state disk storing the valid data to modify the correspondence between the first logical address and the actual address to a correspondence between the second logical address and the actual address. A function of the module may be separately performed by the processor 112 or may be performed by the processor 112 by calling a program in the memory 111. For details, refer to step 505 shown in FIG. 5 and the related description of step 505. Details are not repeated herein.

Figure 9:
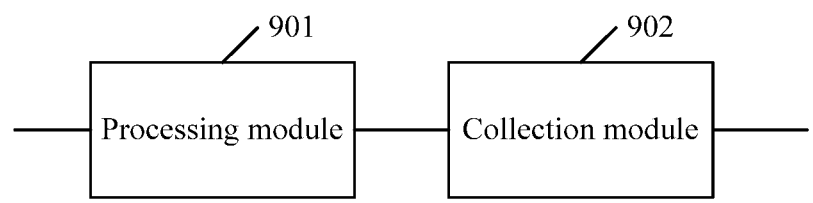
FIG. 9 is a schematic structural diagram of an apparatus for garbage collection in a solid state disk according to an embodiment of the present disclosure.

FIG. 9 is a schematic structural diagram of an apparatus for garbage collection in a solid state disk according to an embodiment of the present disclosure. As shown in FIG. 9, the apparatus includes a processing module 901 and a collection module 902.

The processing module 901 is configured to read, from a to-be-collected first physical block, valid data and reverse mapping information of the valid data, send the reverse mapping information to the system controller, receive a source logical address, sent by the system controller, corresponding to the reverse mapping information, and allocate a target logical address to the valid data, and copy the valid data to a second physical block. A function of the module may be performed by a controller inside a solid state disk 22. For details, refer to step 701 to step 705 shown in FIG. 7 and the related description of step 701 to step 705. Details are not repeated herein.

The collection module 902 is configured to delete a correspondence between the source logical address and an actual address in which the valid data is stored in the first physical block, and create a correspondence between the target logical address and an actual address in which the valid data is stored in the second physical block, and erase data in the first physical block. A function of the module may be performed by the controller inside the solid state disk 22. For details, refer to step 706 and step 707 shown in FIG. 7 and the related description of step 706 and step 707. Details are not repeated herein.

A person of ordinary skill in the art will understand that all aspects of the present disclosure or possible implementations of the aspects may be further implemented as a system, a method, or a computer program product. Therefore, each aspect of the present disclosure or a possible implementation of each aspect may use forms of hardware only embodiments, software only embodiments (including firmware, resident software, and the like), or embodiments with a combination of software and hardware aspects, which are uniformly referred to as "circuit", "module", or "system" herein. In addition, each aspect of the present disclosure or the possible implementation of each aspect may take a form of a computer program product, where the computer program product refers to computer-readable program code stored in a computer-readable medium.

The computer-readable medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM), and an optical disc.

A processor in a computer reads computer-readable program code stored in the computer-readable medium such that the processor can perform each step or a functional action specified in a combination of steps in the flowchart.

All computer-readable program code may be executed on a user computer, or some may be executed on a user computer as a standalone software package, or some may be executed on a user computer while some is executed on a remote computer, or all may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on a mentioned function, may be actually performed substantially at the same time, or these blocks may sometimes be executed in a reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person of ordinary skill in the art may use different methods to implement the described functions for each particular application, but it should not be considered that the implementation goes beyond the scope of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A system garbage collection method, comprising:
   determining a first logical chunk group comprising a plurality of first data logical chunks, wherein the first data logical chunks are in a plurality of solid-state disks (SSDs) of a flash memory array, wherein at least one of the first data logical chunks comprises valid data, wherein a location of the valid data is a first logical address of the first data logical chunks, wherein there is a first correspondence between the first logical address and an actual address of a first solid-state disk of the solid-state disks in which the valid data is stored, wherein the first logical chunk group further comprises a first check logical chunk distributed in a second solid-state disk that is different from the solid-state disks, and wherein the second logical chunk group further comprises a second check logical chunk distributed in a third solid-state disk that is different from the solid-state disks;
creating a second logical chunk group comprising a plurality of second data logical chunks, wherein at least one of the second data logical chunks is distributed in the first solid-state disk;
allocating a second logical address in at least one of the second data logical chunks to the valid data; and
instructing the first solid-state disk to modify the first correspondence to a second correspondence between the second logical address and the actual address.

2. The system garbage collection method of claim 1, wherein a quantity of the first data logical chunks is equal to a quantity of at least one of the second data logical chunks.

3. The system garbage collection method of claim 2, further comprising creating the second logical chunk group based on a distribution of the first data logical chunks in the solid-state disks, wherein the second data logical chunks are distributed in the solid-state disks.

4. The system garbage collection method of claim 1, wherein the third solid solid-state disk is the same as the second solid-state disk.

5. The system garbage collection method of claim 1, wherein the third solid solid-state disk is different from the second solid solid-state disk.

6. The system garbage collection method of claim 1, wherein before determining the first logical chunk group, the system garbage collection method further comprises determining that an amount of the valid data is less than a specified threshold.

7. A system controller, comprising:
an interface configured to communicate with a plurality of solid-state disks; and
a processor coupled to the interface and configured to:
determine a first logical chunk group comprising a plurality of first data logical chunks, wherein the first data logical chunks are in the solid-state disks, wherein at least one of the first data logical chunks comprises valid data, wherein a location of the valid data is a first logical address of the first data logical chunks, wherein there is a first correspondence between the first logical address and an actual address of a first solid-state disk of the solid-state disks in which the valid data is stored, wherein the first logical chunk group further comprises a first check logical chunk distributed in a second solid-state disk that is different from the solid-state disks, and wherein the second logical chunk group further comprises a second check logical chunk distributed in a third solid-state disk that is different from the solid-state disks;
create a second logical chunk group comprising a plurality of second data logical chunks, wherein at least one of the second data logical chunks is distributed in the first solid-state disk;
allocate a second logical address in at least one of the second data logical chunks to the valid data; and
instruct the first solid-state disk to modify the first correspondence to a second correspondence between the second logical address and the actual address.

8. The system controller of claim 7, wherein a quantity of the first data logical chunks is equal to a quantity of at least one of the second data logical chunks.

9. The system controller of claim 8, wherein the processor is further configured to create the second logical chunk group based on distribution of the first data logical chunks in the solid-state disks, wherein the second data logical chunks are distributed in the solid-state disks.

10. The system controller of claim 7, wherein the third solid-state disk is the same as the second solid-state disk.

11. The system controller of claim 7, wherein the third solid-state disk is different from the second solid-state disk.

12. The system controller of claim 7, wherein before the processor determines the first logical chunk group, the processor is further configured to determine that an amount of the valid data is less than a specified threshold.

13. A flash memory array, comprising:
a plurality of solid-state disks; and
a system controller coupled to the solid-state disks and configured to:
determine a first logical chunk group comprising a plurality of first data logical chunks, wherein the first data logical chunks are in the solid-state disks, wherein at least one of the first data logical chunks comprises valid data, wherein a location of the valid data is a first logical address of the first data logical chunks, wherein there is a first correspondence is between the first logical address and an actual address of a first solid-state disk of the solid-state disks in which the valid data is stored, wherein the first logical chunk group further comprises a first check logical chunk distributed in a second solid-state disk that is different from the solid-state disks, and wherein the second logical chunk group further comprises a second check logical chunk distributed in a third solid-state disk that is different from the solid-state disks;
create a second logical chunk group comprising a plurality of second data logical chunks, wherein at least one of the second data logical chunks is distributed in the first solid-state disk in which the valid data is stored;
allocate a second logical address in the at least one of the second data logical chunks to the valid data; and
instruct the first solid-state disk to modify the first correspondence to a second correspondence between the second logical address and the actual address.

14. The flash memory array of claim 13, wherein a quantity of the first data logical chunks is equal to a quantity of the at least one of the second data logical chunks.

15. The flash memory array of claim 14, wherein the system controller is further configured to create the second logical chunk group based on distribution of the first data logical chunks in the solid-state disks, wherein the second data logical chunks are distributed in the solid-state disks.

16. The flash memory array of claim 13, wherein the first solid-state disk is configured to:
read, from a first physical block in which the valid data is located, the valid data and reverse mapping information of the valid data; and
send the reverse mapping information to the system controller,
wherein the system controller is further configured to:
query for the second logical address corresponding to the reverse mapping information based on the reverse mapping information; and send the second logical address to the first solid-state disk, and wherein the first solid-state disk is further configured to:
   allocate a third logical address to the valid data;
   copy the valid data to a second actual address of a second physical block;
   delete the second correspondence;
   create a third correspondence between the third logical address and the second actual address; and
   erase data in the first physical block when the first physical block does not comprise other valid data.

17. The flash memory array of claim 16, wherein the reverse mapping information comprises a virtual address of the valid data.

18. The flash memory array of claim 13, wherein the third solid-state disk is the same as the second solid-state disk.

19. The flash memory array of claim 13, wherein the third solid-state disk is different from the second solid-state disk.

20. The flash memory array of claim 13, wherein the system controller is further configured to determine that an amount of the valid data is less than a specified threshold.

\* \* \* \* \*